United States Patent [19]

Heath

[11] Patent Number: 4,753,198
[45] Date of Patent: Jun. 28, 1988

[54] COMPRESSION RATIO CONTROL MECHANISM FOR INTERNAL COMBUSTION ENGINES

[76] Inventor: Kenneth E. Heath, 4504 Wayne Dr., Greenfield, Ind. 46140

[21] Appl. No.: 893,227

[22] Filed: Aug. 4, 1986

Related U.S. Application Data

[63] Continuation-in-part of Ser. No. 826,073, Feb. 4, 1986.

[51] Int. Cl.[4] .............................................. F02B 25/08
[52] U.S. Cl. ...................... 123/51 AA; 123/53 AA; 123/316; 123/90.18; 123/188 GC
[58] Field of Search ........... 123/51 B, 51 BA, 51 BD, 123/26, 292, 316, 188 GC, 90.67, 90.18, 90.17, 51 AA, 52 A, 53 AA, 53 BA, 58 R

[56] References Cited

U.S. PATENT DOCUMENTS

| | | |
|---|---|---|
| 1,077,956 | 11/1913 | Fox . |
| 1,418,209 | 5/1922 | Smith ............................... 123/90.18 |
| 1,497,206 | 6/1924 | Booton ............................ 123/90.18 |
| 1,889,641 | 11/1932 | Dainton . |
| 1,914,707 | 6/1933 | Wolf . |
| 2,311,254 | 2/1943 | Raybon . |
| 2,334,917 | 11/1943 | Ford . |
| 2,357,022 | 8/1944 | Raybon . |
| 2,530,884 | 11/1950 | Laraque . |
| 2,878,799 | 3/1959 | Brenneke . |
| 3,046,961 | 7/1962 | Dolza . |
| 3,333,578 | 8/1967 | Muller . |
| 3,633,554 | 1/1972 | Nakajima et al. ................ 123/90.18 |
| 3,638,624 | 2/1972 | O'Grady . |
| 3,730,150 | 5/1973 | Codner ............................ 123/90.18 |
| 3,945,355 | 3/1976 | Calviac . |
| 4,131,095 | 12/1978 | Ouchi .............................. 123/90.18 |
| 4,232,641 | 11/1980 | Curtil ............................... 123/316 |
| 4,258,672 | 3/1981 | Hietikko . |
| 4,316,437 | 2/1982 | Bertrand . |
| 4,352,344 | 10/1982 | Aoyama et al. . |
| 4,356,798 | 11/1982 | Sakaoka et al. . |
| 4,494,506 | 1/1985 | Hayama et al. .................. 123/90.18 |
| 4,528,958 | 7/1985 | Yoshida et al. . |
| 4,570,581 | 2/1986 | Titolo . |

FOREIGN PATENT DOCUMENTS

| | | | |
|---|---|---|---|
| 2270443 | 12/1975 | France . | |
| 55-87833 | 7/1980 | Japan . | |
| 55-87834 | 7/1980 | Japan . | |
| 59-7714 | 1/1984 | Japan . | |
| 262070 | 6/1949 | Switzerland ................... | 123/316 |
| 360496 | 11/1931 | United Kingdom . | |

*Primary Examiner*—Charles J. Myhre
*Assistant Examiner*—David A. Okonsky
*Attorney, Agent, or Firm*—Jeffers, Hoffman & Niewyk

[57] ABSTRACT

An intake manifold arrangement for internal combustion engines whereby the combustion chamber can be supercharged without the use of mechanical gears and/or pumps. A pressure chamber is mounted upon the combustion chamber and communicates with the combustion chamber and an air and fuel mixture supply. A check valve for selectively allowing the mixture to enter the pressure chamber is provided between the air and fuel supply and the pressure chamber. An intake valve for providing selective communication between the pressure chamber and the combustion chamber is provided and controlled by the compression ratio control mechanism. The compression ratio control mechanism includes an axially slidable cam having a lifting surface of greater duration axially at one end of the cam than the other end of the cam. The cam is selectively axially shifted by an accelerator pedal which controls a hydraulic piston coupled to the cam. The intake valve is opened during the intake stroke and the mixture is drawn into the combustion chamber. The pressure chamber is pressurized during the compression stroke while the intake valve is open and the compression ratio in the combustion chamber is selectively controlled by closing the intake valve at a point during the compression stroke by the selectively slidable cam. An exhaust boost or scavenging arrangement is provided whereby pressurized air is selectively forced into the combustion chamber.

21 Claims, 7 Drawing Sheets

COMPRESSION RATIO CONTROL MECHANISM FOR INTERNAL COMBUSTION ENGINES

BACKGROUND OF THE INVENTION

This application is a continuation-in-part of application Ser. No. 826,073, filed Feb. 4, 1986.

This invention relates generally to four cycle internal combustion engines and, more particularly, to an intake manifold arrangement for supercharging the combustion chamber without the use of gears, impellers and/or mechanical pumps. More specifically, the invention is directed to an intake manifold arrangement wherein the air and fuel supply first travels through an adjustable check valve, a pressure chamber and then through the intake valve and into the combustion chamber. The intake valve is controlled so as to open during the intake stroke and selectively close at a point during the compression stroke thereby selectively changing the compression ratio in the combustion chamber while the engine is running.

In the past, supercharging of a combustion chamber has been done by using various mechanical pumps to pressurize the air and fuel mixture prior to its entering the combustion chamber. This method of supercharging, however, must use a portion of the engine output power to drive the gears, impellers, and/or mechanical pumps. Accordingly, the overall efficiency of the supercharged engine is decreased. A disadvantage to mechanical pump-type superchargers is that they are often mechanically complex and subject to failure. In the case of exhaust gas driven superchargers, oil tends to cake on the impeller bearings if not properly cooled down before shutting off the engine.

Furthermore, in the past, preheating of the fuel and air mixture has been done externally of the combustion chamber where the temperatures for heating the fuel and air mixture are lower than the temperature of the combustion chamber wall and the immediate vicinity. Thus, the fuel and air mixture has not been heated and vaporized to the fullest extent possible whereby it can be burned in the most efficient manner. Accordingly, internal combustion engines have not been efficient due to inefficient burning of fuel. Many prior art fuel preheaters require an external source of energy, such as battery powered electrical heating elements.

In conventional engines, the spent fuel within the combustion chamber is exhausted by the pistons traveling to top dead center during the exhaust stroke. In some cases, as shown in U.S. Pat. No. 3,046,961, residual exhaust gases have been removed from the combustion chamber by a charge of fresh air being forced into the combustion chamber substantially at the top thereof at about the top dead center position of the piston. As can be appreciated, this is not very efficient because the charge of air introduced at the top of the cylinder near top dead center does not necessarily cause exhaust gases near the piston, during the beginning of the exhaust stroke, to exit through the exhaust valve.

Further yet, conventional engine utilize accelerator pumps whereby gas is squirted into the carburetor to enhance acceleration. This tends to be wasteful in that the squirted gas provides a very rich fuel/air mixture and an improper burn thereof occurs. Also, when idling, conventional engines tend to run inefficiently and rough because closing the throttle chokes down the supply of air through the carburetor.

SUMMARY OF THE INVENTION

It is the principal object of the invention to overcome the above-discussed disadvantages associated with earlier internal combustion engines utilizing supercharging devices and air scavenging methods for removing residual exhaust gases from within the combustion chamber. Further, it is an object of the invention, in one form thereof, to control the acceleration and speed of the engine by controlling the compression ratio of the combustion chamber and eliminating the need for an accelerator pump. It is a further object of the present invention to provide a constant fuel/air mixture, decreasing only the compression ratio when power is not needed and when the engine is idling, and increasing the compression ratio during acceleration and when power is needed and the engine is running at high speeds, thereby increasing the overall efficiency of the engine throughout its operation. It is also an object of this invention to provide a structure whereby the above objects can be accomplished in an economical manner.

The objects of the invention are obtained, in a preferred form of the invention, by providing a pressure chamber mounted directly upon the combustion chamber and communicating with the combustion chamber and the air and fuel supply. At the connection between the air and fuel supply and the pressure chamber, there is provided an adjustable check valve for selectively allowing the air-fuel mixture to enter the pressure chamber. At the port between the pressure chamber and the combustion chamber, there is provided a conventional intake valve for allowing the mixture within the pressure chamber to enter the combustion chamber and thereafter reenter the pressure chamber. The intake valve is controlled such that is opens at the start of the intake stroke and closes at substantially halfway between top dead center and bottom dead center during the compression stroke. The check valve admits fuel and air mixture to the pressure chamber only during the portion of the intake stroke when a vacuum is present.

The objects of the invention are further obtained by providing an air port on the side of the cylinder wall leading into the combustion chamber substantially halfway between the top dead center and bottom dead center piston positions. The air port communicates with a pressurized air supply via an on/off air valve. The air valve is controlled so that it opens and forces air to flow through the port into the combustion chamber starting at the beginning of the exhaust stroke and until the piston is near the air port.

The objects of the present invention, in one form thereof, are also obtained by providing a compression ratio control mechanism for selectively controlling the compression ratio in the combustion chamber by selectively varying the point of when the intake valve is closed. The opening and closing of the intake valve is controlled by an axially slidable camshaft and cam combination wherein the cam has a lifting surface which increases in duration axially from one end of the cam to the other. The lifting surface starts at substantially the same point in time as the cam rotates with the camshaft. The camshaft and cam are selectively moved axially through the use of a hydraulic piston and cylinder assembly which is controlled by a variable resistance valve coupled to the accelerator pedal. A spring is provided for transmitting the force of the pedal to the valve and a dashpot is also provided for creating a time delay between the movement of the accelerator pedal and the opening of the valve.

The invention, in one form thereof, is an internal combustion engine including a combustion chamber having a piston disposed therein. A pressure chamber is provided and a first valve provides selectively communication between the pressure chamber and the combustion chamber. A second valve provides selective communication between the pressure chamber and a fuel and air mixture supply. The compression ratio in the combustion chamber is controlled by opening the first valve during the intake stroke of the piston and selectively closing the first valve during the compression stroke of the piston. The pressure chamber is pressurized during the compression stroke of the piston while the first valve is open. The compression ratio in the combustion chamber is selectively controlled by causing the first valve to selectively close at a point during the compression stroke.

The invention, in one form thereof, is provided in a four-cycle internal combustion engine having a combustion cylinder defining a combustion chamber having a piston disposed therein. A pressure chamber is connected to the combustion chamber and to a fuel and air mixture intake passage. A check valve is located between the pressure chamber and the intake passage for allowing the mixture to flow only towards the pressure chamber and an intake valve is located between the pressure chamber and the combustion chamber. A compression ratio control mechanism is provided including an axially slidable camshaft mounted to the engine and adapted for rotational movement. The camshaft is driven in timed relation by the engine and a cam is connected to the camshaft rotating and sliding therewith. The cam has a lifting surface of substantially linearly increasing duration axially from one end of the cam to the other end of the cam and the lifting surface starts at substantially the same point in time as the cam rotates with the camshaft. A cam follower mechanism slidingly rests on the cam and is coupled to the intake valve whereby the intake valve is opened by the lifting surface. The camshaft and cam are selectively axially shifted and the intake valve is opened during the intake stroke of the piston and selectively closed at a point during the compression stroke of the piston depending on the axial position of the cam. The pressure chamber is pressurized during the compression stroke after the bottom dead center piston position and before the closing of the intake valve and the compression ratio in the combustion chamber is controlled by the point of closing the intake valve by axially shifting the cam.

BRIEF DESCRIPTION OF THE DRAWINGS

The above-mentioned and other features and objects of this invention and the manner of obtaining them will become more apparent and the invention itself will be better understood by reference to the following description of an embodiment of the invention taken in conjunction with the accompanying drawings wherein.

Corresponding reference characters indicate corresponding parts throughout the several views of the drawings.

DETAILED DESCRIPTION OF THE PREFERRED EMBODIMENT

Figure 1:
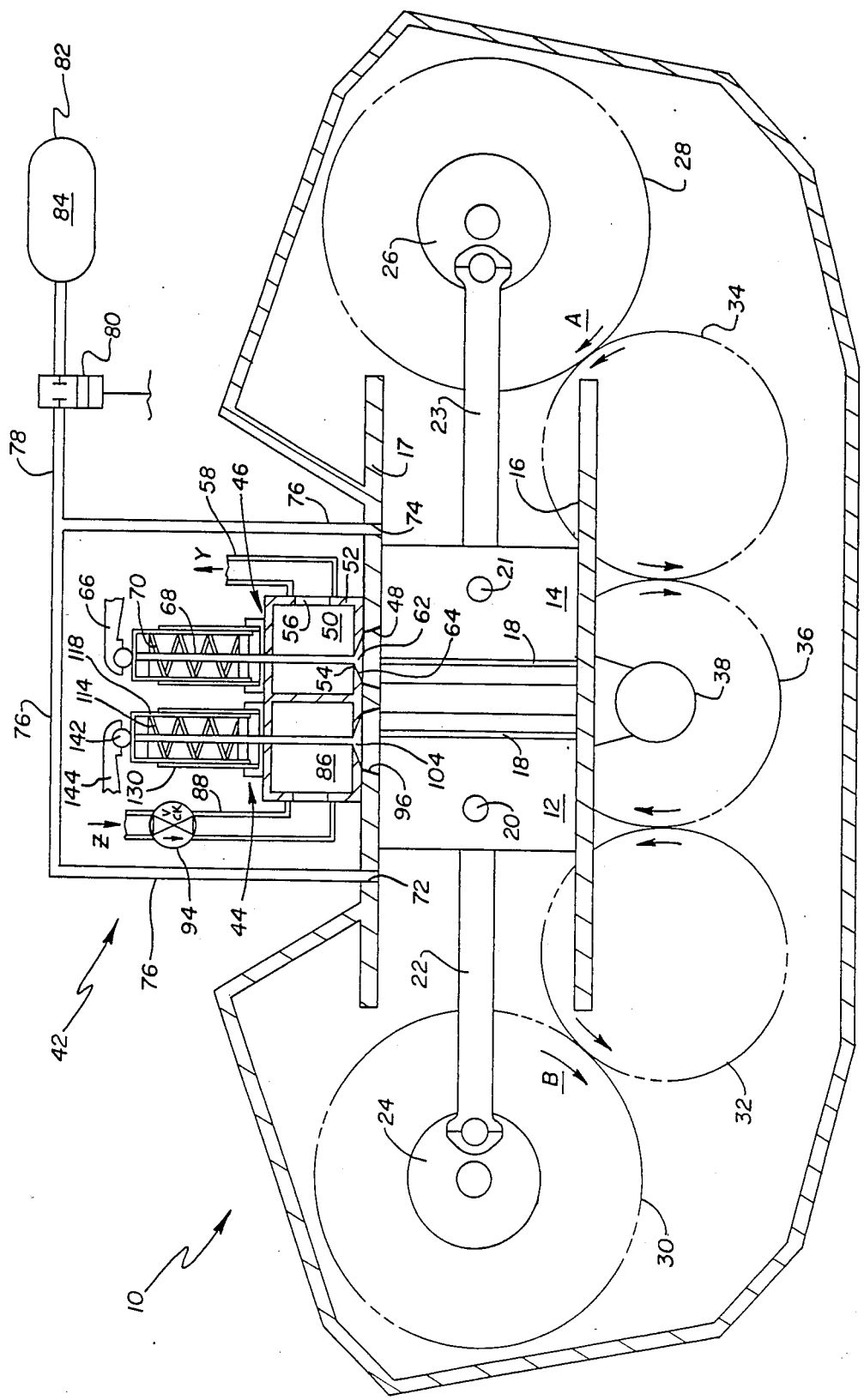
FIG. 1 is a cross-sectional elevational view of a preferred embodiment of the engine according to the present invention.

Referring to FIG. 1, there is generally shown a double opposing piston internal combustion engine 10 according to a preferred embodiment of the invention. Engine 10 has a combustion chamber 16 in which there is located power piston 12 and power piston 14. Power pistons 12 and 14 have a piston ring 18 connected thereto in a known and customary manner. Power piston 14 is connected to connecting rod 23 via piston pin 21. Connecting rod 23 is, in turn, connected to side crankshaft 26. Crankshaft 26 is coupled with side gear 28 and is adapted to rotate clockwise as shown by arrow A. Power piston 12 is connected to connecting rod 22 via piston pin 20. Connecting rod 22, in turn, is connected to side crankshaft 24. Crankshaft 24 is coupled with side gear 30 which is adapted to turn in a clockwise direction as shown by arrow B. Side gear 30 is coupled with and drives intermediate gear 32 which, in turn, is coupled with and drives power gear 36. On the right hand side thereof, side gear 28 is coupled with and drives intermediate gear 34 which, in turn, is coupled with and drives power gear 36. Power gear 36 is coaxially coupled with power shaft 38 which may be connected to a work load. Pistons 12 and 14, side gears 28 and 30, intermediate gears 32 and 34, and power gear 36 are all located within engine housing 40. Within engine housing 40 there is provided lubricating oil in a known manner for lubricating the pistons and gears and any other moving parts located therein.

Engine 10 utilizes a manifold arrangement generally indicated by 42. As shown in FIGS. 1 and 3a–3e, manifold arrangement 42 is made up of an intake arrangement generally indicated by 44 and an exhaust arrangement generally indicated by 46. Exhaust manifold arrangement 46 has an exhaust chamber 50 comprising chamber walls 52. Exhaust chamber 50 communicates with combustion chamber 16 via frusto-conical bore 48 located within combustion chamber wall 17 and through exhaust chamber valve port 54 located within exhaust chamber wall 52. Exhaust chamber 50 also communicates with exhaust pipe 58 via exhaust port 56 located within exhaust chamber wall 52. During the exhaust stroke, exhaust gases travel from within combustion chamber 16 to exhaust chamber 50 and then through exhaust pipe 58 into the atmosphere as indicated by arrow Y.

Exhaust gases within combustion chamber 16 are selectively allowed to enter exhaust chamber 50 by selectively pushing exhaust valve seating portion 62 off of and out of contact of exhaust valve seat 64 located within exhaust chamber wall 52. Exhaust valve seating portion 62 is selectively pushed off of valve seat 64 by a cam coupled with power shaft 38 (not shown) and with rocker arm 66 which is forced to selectively push valve stem 68 downwardly and against the force provided by spring 70. The mechanical valve components below rocker arm 66 are identical to the mechanical valve components utilized with intake manifold arrangement 44 and thus will be discussed hereinbelow with respect to intake manifold arrangement 44. The selective opening of the exhaust valve with respect to the locations of power pistons 12 and 14 will also be discussed below.

Figure 3A:
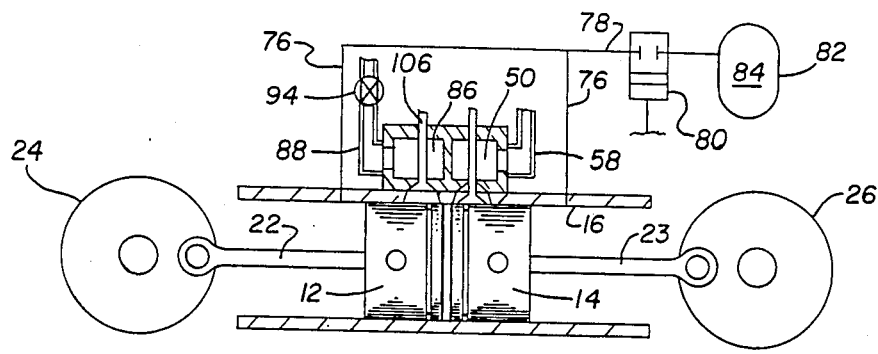
FIG. 3a is a diagrammatic partial cross-sectional view of the engine of FIG. 1 showing the pistons located in a top dead center position prior to the exhaust valve closing.
Figure 3B:
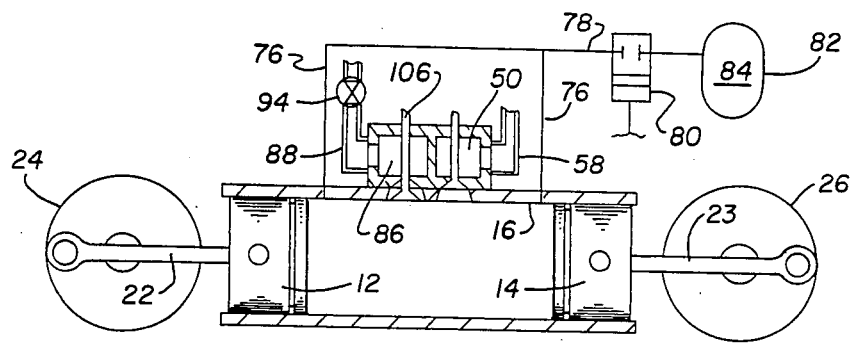
FIG. 3b is a diagrammatic partial cross-sectional view of the engine of FIG. 1 showing the pistons at bottom dead center after the compression stroke and showing the intake valve in an open position.
Figure 3C:
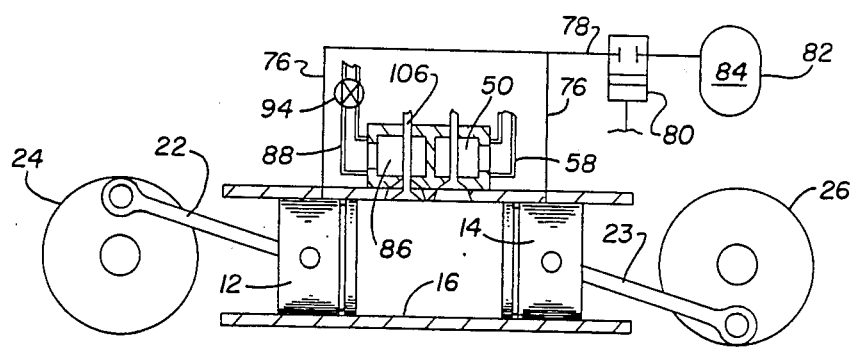
FIG. 3c is a diagrammatic partial cross-sectional view of the engine of FIG. 1 showing the pistons substantially halfway between bottom and top dead center positions just prior to the closing of the intake valve.
Figure 3D:
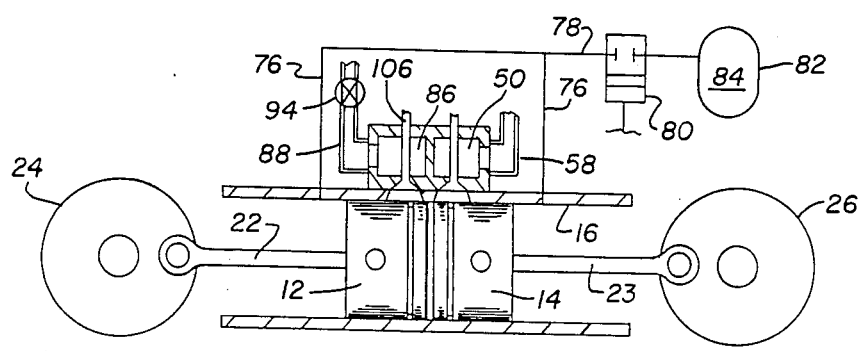
FIG. 3d is a diagrammatic partial cross-sectional view of the engine of FIG. 1 showing the pistons in a top dead center position prior to the power stroke.
Figure 3E:
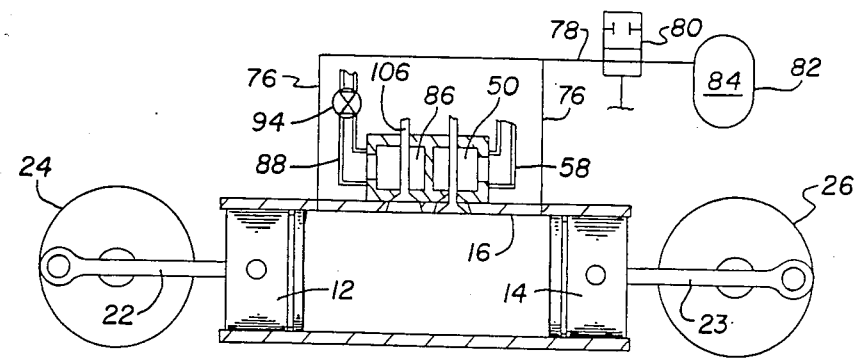
FIG. 3e is a diagrammatic partial cross-sectional view of the engine of FIG. 1 showing the pistons in a bottom dead center position just prior to the exhaust stroke and showing the exhaust valve and fresh air valve in open positions.

To assist the quick and efficient clearing of exhaust gases within combustion chamber 16, after the power stroke, an exhaust boost or scavenging arrangement is provided as shown in FIGS. 1 and 3a–3e. More specifically, air holes 72 and 74 are provided on the side of combustion chamber 16 substantially halfway between top dead center and bottom dead center positions of power pistons 12 and 14. Air holes 72 and 74 communicate with air lines 76 which "T" into air line 78. Air line 78 is connected to schematically shown on/off air valve 80 which communicates with pressure vessel 82 having therein pressurized air 84. Air valve 80 is coupled with a camming arrangement which is coupled with power shaft 38 (not shown) so as to selectively open and close air valve 80 with respect to the position of power pistons 12 and 14. Air valve 80, in FIG. 1, is shown in the closed position wherein pressurized air 84 within vessel 82 is prohibited from traveling via air lines 78 and 76 to within combustion chamber 16. In FIG. 3e, air valve 80 is shown in the open position whereat pressurized air 84 within vessel 82 is allowed to travel through lines 78 and 76 through air holes 72 and 74 thereby assisting exhaust gases within combustion chamber 16 to flow out therefrom through exhaust chamber 50 and exhaust pipe 58.

Figure 2:
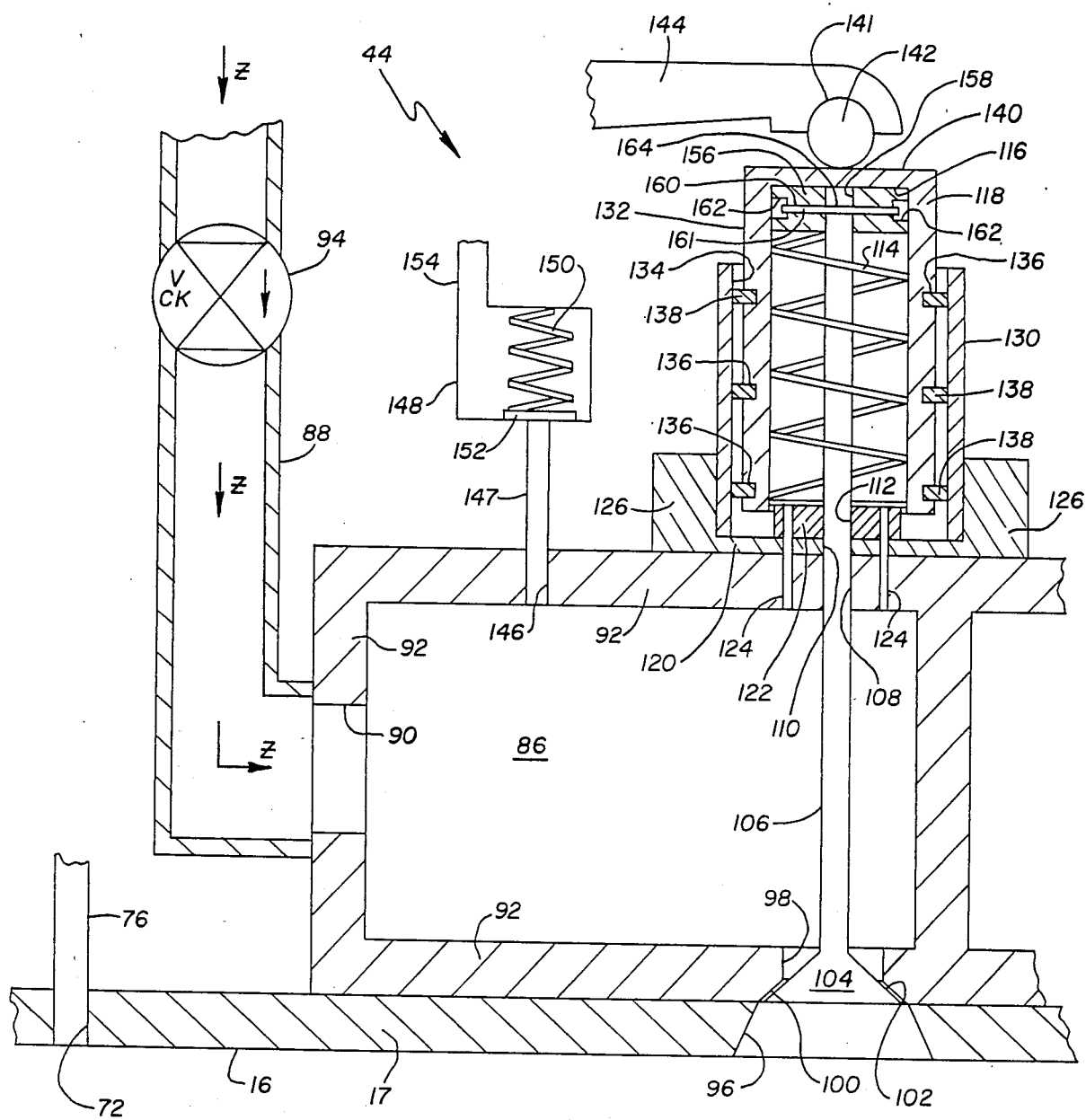
FIG. 2 is an enlarged fragmentary cross-sectional view of the intake manifold arrangement shown in FIG. 1.

Referring now to FIGS. 1 and 2, there is an intake manifold arrangement 44 wherein intake pressure chamber 86 communicates with intake air and fuel supply line 88 via intake chamber bore 90 located within intake chamber wall 92. Air and fuel supply line 88 is provided with adjustable check valve 94 which allows the air and fuel mixture to flow only in the direction of the arrows indicated by Z. Adjustable check valve 94 allows the air/fuel mixture to flow therethrough only when a vacuum is present within intake pressure chamber 86. Check valve 94 is adjustable so that is will open only upon the occurrence of a preset vacuum within intake pressure chamber 86.

Intake pressure chamber 86 also communicates with combustion chamber 16 via valve bore 98 located within chamber wall 92 and through frusto-conical bore 96 located within combustion chamber wall 17. Between frusto-conical bore 96 and valve bore 98, there is provided a valve seat 100 which communicates with valve seating portion 102 located annularly around valve conical portion 104 whereby a seal is provided between intake pressure chamber 86 and combustion chamber 16. Intake valve conical portion 104 is integral with intake valve stem 106 which extends upwardly through coaxially aligned intake chamber bore 108, mounting ring bore 100, cylindrical ring bore 112 and spring 114.

Intake chamber bore 108, mounting ring bore 110 and guiding ring bore 112 are located within intake pressure chamber wall 92, mounting bracket 120 and guiding ring 122 respectively. Intake chamber bore 108, mounting bracket bore 110 and guiding ring bore 112 have a plurality of intake valve relief holes 124 which communicate with each other and are provided to equalize the pressure between intake pressure chamber 86 and the interior of intake valve piston 118.

Mounting ring 120 is mounted upon intake pressure chamber 86 by welding or other suitable means. Mounting ring 120, further, has an annular portion 126 which extends upwardly from mounting ring 120. Annular portion 126 has inserted and sealingly mounted therein stationary cylinder 130 which is coaxial with valve stem 106 and extends upwardly from mounting ring 120.

Intake valve stem 106 is received within retaining ring coaxial bore 158 located coaxially within retaining ring 156. Retaining ring 156 has radial pin bore 160 at the ends of which there are located countersunk bores 162. A retaining pin 161 is inserted within radial pin bore 160 and through radial valve stem bore 164 thereby connecting retaining ring 156 to the end portion of valve stem 106. The length of retaining pin 161 is shorter than the diameter of retaining ring 156. Spring 114 pushes against retaining ring 156 forcing valve 106 upwardly and thereby also forcing valve seating portion 102 sealingly against valve seat 100.

Intake valve piston 118 is located coaxially within stationary cylinder 130 and has its cylindrical outer surface 132 facing the cylindrical inner surface 134 of stationary cylinder 130. Retaining ring 156 is received within valve piston 118 and is in contact with the inside flat portion 116 of intake valve piston 118. Intake valve piston 118 has on its cylindrical outer surface 132 annular grooves 136 in which are received valve piston rings 138. Valve piston rings 138 are lubricated in a known manner and provide a sliding seal so as to prevent the air/fuel mixture within intake pressure chamber 86 from escaping from the interior of valve piston 118. Intake valve piston 118 further has an outside circular flat portion 140 upon which there is slidingly located ball bearing 142 which is mounted within a socket 141 is intake valve rocker arm 144. Bearing 142 is provided to allow for the horizontal movement of rocker arm 144 with respect to intake valve piston 118 as rocker arm 144 pivots around its pivot point, (not shown). Rocker arm 144 is selectively caused to push downwardly by a control means such as a push rod and cam coupled to power shaft 38 in a conventional manner. Thus, communication between pressure chamber 86 and cylinder 16 is selectively caused to occur depending on the location of power pistons 12 and 14 while also preventing the escape of air and fuel mixture from within pressure chamber 86 into the atmosphere. The opening and closing of the intake valve with respect to the location of power pistons 12 and 14 will be described hereinbelow.

Pressure chamber 86 further has relief opening bore 146 within intake pressure chamber wall 92 for communication with safety relief valve 148 via relief line 147. Safety relief valve 148 can be selectively preset by adjusting the force exerted by spring 150 to opening gate 152 so as to allow for the opening of gate 152 whenever a preset pressure is reached within intake pressure chamber 86. Fuel and air mixture caused to travel through relief valve 148 may be routed through relief line 154 to either the atmosphere or back through the intake air and fuel supply line or both.

Figure 4:
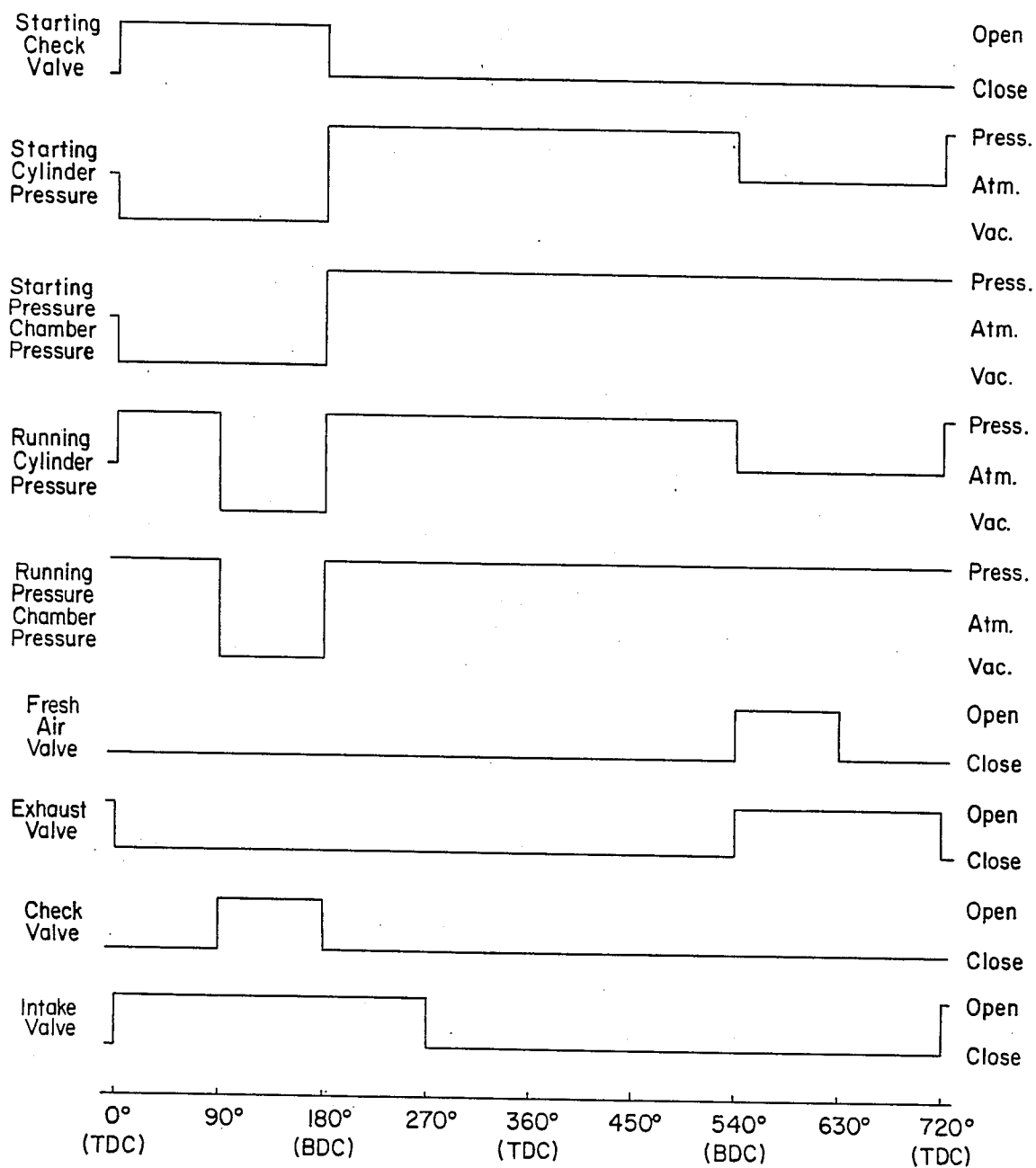
FIG. 4 is a graphical representation showing the position of the intake valve, check valve, exhaust valve and fresh air valve along with the state of the pressures within the pressure chamber and the combustion chamber during a starting cycle and a running cycle.

Referring now to FIGS. 3a-3e and FIG. 4, the operation of internal combustion engine 10 is described by going through one full cycle made up of an intake, compression, power and an exhaust stroke. One full cycle is described herein in degrees and, further, as shown in FIG. 4, 0-720° represents one full cycle.

As shown in FIG. 4, prior to starting engine 10, it is assumed that combustion chamber 16 and intake pressure chamber 86 are at atmospheric pressure. Zero degrees top dead center position is shown in FIG. 3a and FIG. 4 just prior to the exhaust valve closing. Accordingly, immediately after 0°, the exhaust valve is closed and the intake valve opens. Power pistons 12 and 14 travel away from each other thereby creating a vacuum from 0°-180°. The vacuum during this period causes check valve 94 to open and allow air and fuel mixture to enter pressure chamber 86 and combustion chamber 16. Prior to reaching bottom dead center at 180°, as shown in FIG. 3b, the intake valve is open and air and fuel mixture is allowed to enter pressure chamber 86 and combustion chamber 16. After 180°, power pistons 12 and 14 travel toward each other thereby causing pressurization of the mixture within combustion chamber 16 and pressure chamber 86 thereby also causing check valve 94 to close. From 180° to approximately 270°, the intake valve remains open while check valve 94 remains closed and, thus, a portion of the fuel and air mixture travels from combustion chamber 16 back into pressure chamber 86. At approximately 270°, the intake valve is closed thereby leaving the air and fuel mixture within pressure chamber 86 in a pressurized state. Power pistons 12 and 14 thereafter continue to travel to top dead center or 360° (FIG. 3d) whereat the fuel and air mixture compressed therein is ignited by a sparkplug (not shown) causing the pistons to travel backwards to bottom dead center or 540°.

It should be noted that in the preferred embodiment, as shown in FIGS. 5-10, the point at which the intake valve is closed is controlled by the compression ratio control mechanism. Through the compression ratio control mechanism, both the pressurization of pressure chamber 86 and the compression ratio in combustion chamber 16 are selectively controlled.

At 540° or bottom dead center, the exhaust valve and fresh air valve 80 are opened, as shown in FIG. 3e, thereby clearing the spent fuel out of combustion chamber 16 through exhaust chamber 50 and exhaust pipe 58. From 540° to approximately 630°, air valve 80 remains open forcing air within combustion chamber 16 and the exhaust gases therein are assisted in moving out of combustion chamber 16 while fresh air is provided within combustion chamber 16 so as to help combustion during the next cycle. At approximately 630°, air valve 80 is caused to be closed and thereafter power pistons 12 and 14 travel to top dead center or 720° so as to push out any remaining exhaust gases within combustion chamber 16. At this point, the 0°-720° cycle is repeated, however, as shown in FIG. 4, the running combustion chamber and pressure chamber pressures cycle differently.

More specifically, as shown in FIG. 4, after engine 10 has started, pressure chamber 86 will already be in a pressurized state at 0° top dead center. Accordingly, as soon as power pistons 12 and 14 start to move away from each other during the intake stroke after 0°, the intake valve will open and cause the previously pressurized fuel and air mixture within pressure chamber 86 to travel into and supercharge combustion chamber 16. During the intake stroke, substantially between top dead center and bottom dead center, or 90°, a vacuum will again be present in chamber 86 due to the movement of power pistons 12 and 14 away from each other. At that point, check valve 94 will again open and allow air and fuel mixture to flow therethrough. During this running cycle, however, check valve 94 is open only from approximately 90° to 180° or to the point of power pistons 12 and 14 reaching bottom dead center. Thereafter, from 180°-270°, power pistons 12 and 14 will again cause pressure chamber 86 to become pressurized, and at approximately 270° the intake valve will close and power pistons 12 and 14 will continue to top dead center for the next power stroke. The power stroke and exhaust stroke is then repeated as was done in the starting cycle between 360° and 720°.

As can be appreciated, the intake manifold arrangement described above provides a means for supercharging combustion chamber 16 without the use of separate moving gears, impellers or a mechanical pump. Accordingly, the power output and the efficiency of engine 10 are both increased. Furthermore, after engine 10 is warmed up, the air and fuel mixture traveling to within combustion chamber 16 and then back into pressure chamber 86 is caused to be heated by combustion chamber wall 17 and pressure chamber walls 92 thereby causing the fuel to be better vaporized and burn more efficiently and to, further, increase efficiency. By adjusting check valve 94, the point of when air and fuel mixture is allowed to travel to within pressure chamber 86 can be controlled and thus the amount of fuel utilized by engine 10 can also be controlled. The size of pressure chamber 86 can be increased or decreased so as to provide a higher or lower pressurized supercharge, respectively.

Annular portion 126 and stationary cylinder 130 may be provided integrally with pressure chamber walls 92. Furthermore, pressure chamber walls 92 can be provided integrally with combustion chamber wall 17 whereby better heat transfer is provided between combustion chamber wall 17 and pressure chamber walls 92 and thereby also causing better vaporization of the air and fuel mixture.

Retaining ring 156 may be connected to the end portion of valve stem 106 by permanent welding. In the alternative, retaining ring 156 can be eliminated and a bolt can be inserted through valve piston flat portion 140 and threadably received within a threaded hole located axially within valve stem 106. In this embodiment, spring 114 would push directly against valve piston inside flat portion 116.

Figure 5:
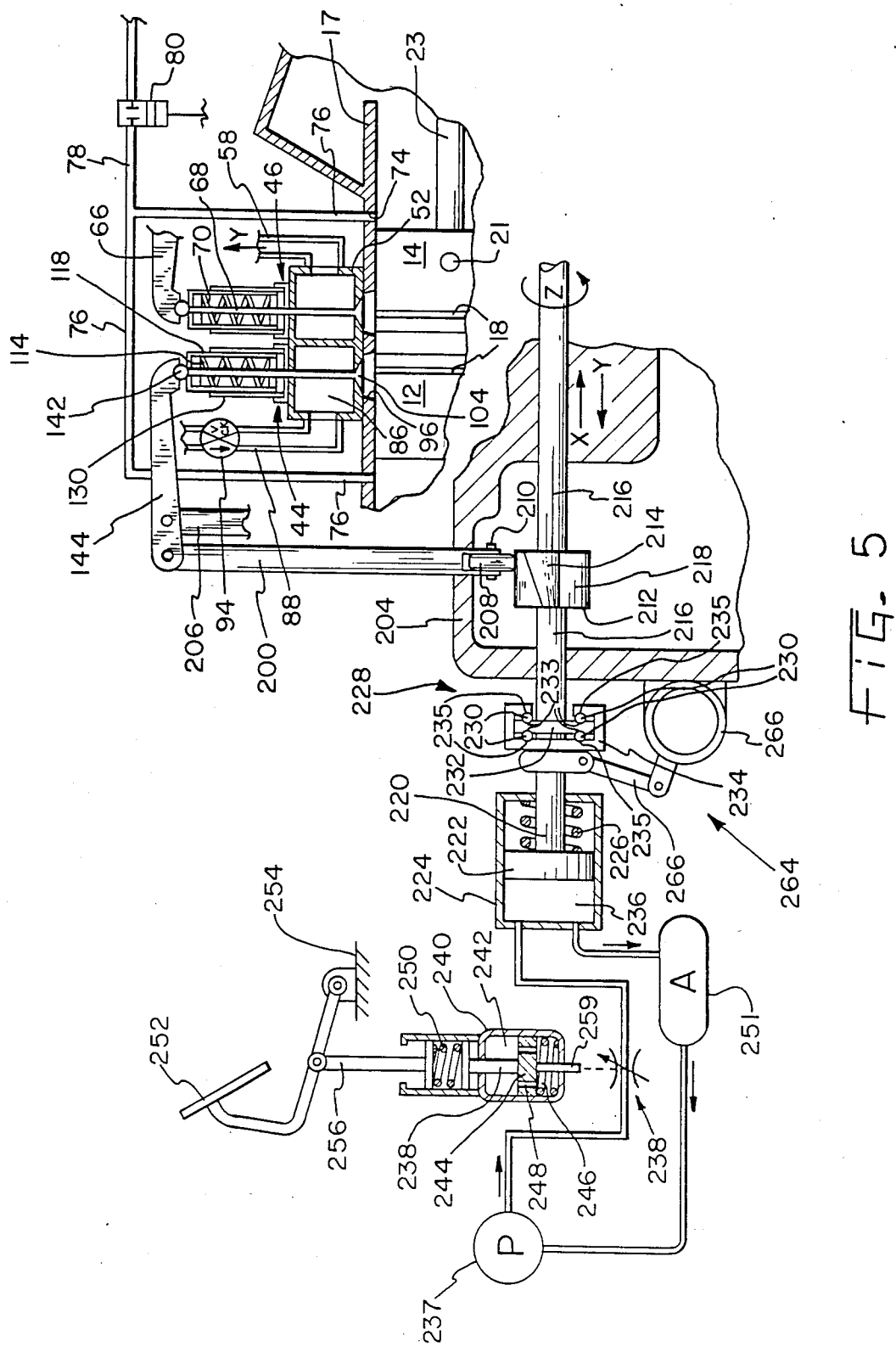
FIG. 5 is a diagrammatic cross-sectional view of the compression ratio control mechanism of the engine shown in FIG. 1.

Referring now to FIGS. 5–10, the compression ratio control mechanism will be described. More specifically, as shown in FIG. 5, push rod 200 is pivotally connected to rocker arm 144. Rocker arm 144 is also pivotally connected to pivot point member 206, which is mounted to a rigid structure such as the engine block. Accordingly, the axial movement of push rod 200 causes the intake valve to open and close.

Push rod 200 is adapted for axial movement through engine structure 204 and has, at the other end of the pivotal connection to rocker arm 144, a roller 208 being connected to rod 200. Roller 208 is rotatably held in position by pin 210 and is urged against cam 212 by the force of spring 114. Cam 212 is connected to camshaft 216 which is adapted for axial movement as indicated by arrows X and Y and rotational movement as indicated by arrow Z. Camshaft 216 is rotationally driven by engine 10 in a known and customary manner (not shown).

Figure 6:
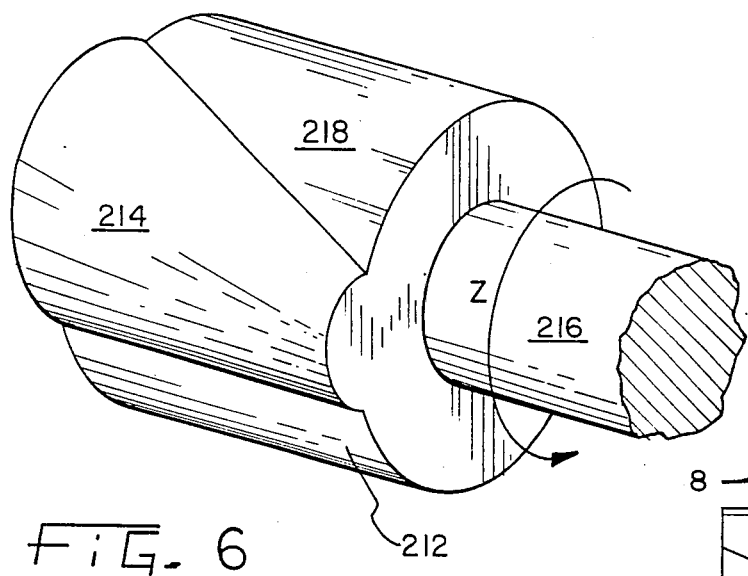
FIG. 6 is a perspective view of the cam shown in the compression ratio control mechanism of FIG. 5.
Figure 7:
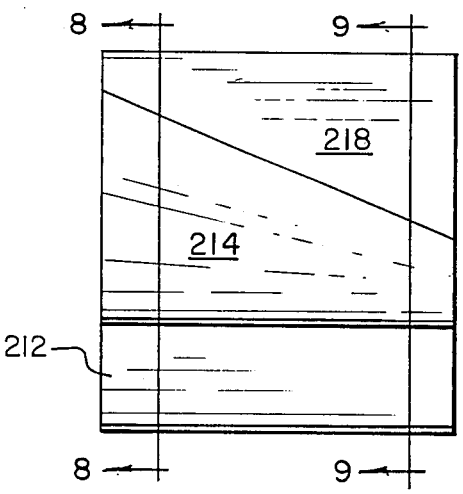
FIG. 7 is a front elevational view of the cam shown in the compression ratio control mechanism of FIG. 5.
Figure 8:
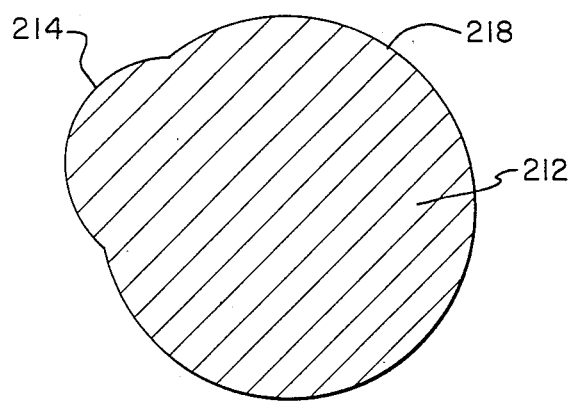
FIG. 8 is a cross-sectional view of the cam shown in FIG. 7 taken along line 8—8.
Figure 9:
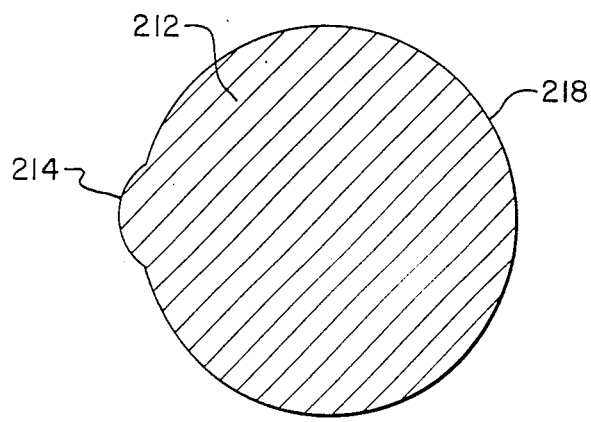
FIG. 9 is a cross-sectional view of the cam shown in FIG. 7 taken along line 9—9.

As more clearly shown in FIGS. 6–9, cam 212 has a lifting surface 214 and a cam surface 218. Thus, as cam 212 rotates with camshaft 216, roller 208 and push rod 200 are lifted up and down by lifting surface 214. The duration for which lift is provided by lifting surface 214 depends on the axial position of cam 212 relative to roller 208. As shown in FIGS. 6 and 7, the duration of lift axially at one end of cam 212, as cam 212 rotates, is greater than the duration of lift at the other end of cam 212. Further, the duration of lift from one end of cam 212 to the other end of cam 212 increases substantially in a linear fashion, although a non-linear cam can be used. Further yet, because cam 212 rotates in the direction shown by arrow Z, the point in time of when lifting of roller 208 begins remains the same regardless of the axial position of cam 212. However, the point in time of when the lifting of roller 208 ceases and the closing of the intake valve occurs, changes by the axial position of cam 212 relative to roller 208.

An axial shifting mechanism is provided coupled to camshaft 216 and cam 212 so as to selectively axially shift cam 212, thereby selectively increasing and decreasing the duration of lift and the opening of the intake valve. To this end, camshaft 216 is coupled to rod 220 which is connected to hydraulic piston 222 through the use of coupling 228. Coupling 228 includes race 232 which is connected to camshaft 216 and has annular recesses 233. Cage 234 is connected to rod 220 and also has circular recesses 235 opposite recesses 233 of race 232. Ball bearings 230 are provided between recesses 233 and 235, thus, allowing camshaft 216 and race 232 to rotate about their axes independent of and without causing rod 220 and piston 222 to rotate therewith. Rod 220 and camshaft 216 are, however, coupled axially so that the axial movement of rod 220 also causes the axial movement of camshaft 216.

Piston 222 and rod 220 are caused to move axially by providing pressure in hydraulic pressure chamber 236 and by spring 226. The hydraulic pressure in chamber 236 is controlled through the use of a valve means, such as a throttle valve 238, connected between the hydraulic pressure supply or pump 237 and chamber 236. More specifically, hydraulic pressure is provided in chamber 236 by opening valve 238, overcoming the force of spring 226, and causing camshaft and cam 212 to slide axially in the direction indicated by arrow X. Alternatively, by decreasing the pressure within chamber 236, the force of spring 226 overcomes the hydraulic force and causes camshaft 216 and cam 212 to slide axially in the direction indicated by arrow Y. It should be noted that hydraulic fluid leaving chamber 236 temporarily accumulates in accumulator 251, which is connected between chamber 236 and hydraulic pump.

The opening and closing of valve 238 is controlled by depressing accelerator control pedal 252, which is pivotally connected to a rigid structure 254, such as an automobile body. Accelerator pedals 252 is also pivotally connected to rod 256 adapted to provide a force against accelerator spring 250 as accelerator pedal 252 is depressed. In the embodiment shown in FIG. 5, a dashpot 240 is connected between spring 250 and valve 238 for providing a time delay between the movement of accelerator pedal 252 and the opening of valve 238. Dashpot 240 includes piston 244 having holes 248 therein for allowing a fluid 242, such as oil, to travel therethrough. Dashpot spring 246 is provided for urging piston 244 upwardly and for closing valve 238. Dashpot rods 258 and 259 are connected to piston 244 and transmit the forces of springs 250 and 246 respectively. Further, rod 259 is mechanically connected to valve 238 for opening and closing the same.

In operation, when accelerator pedal 252 is depressed, a downwardly force is transmitted to spring 250. When the downwardly force is greater than the force provided by spring 246, piston 244 and rods 258 and 259 begin to travel downwardly thereby opening valve 238. Dashpot 240 prevents valve 238 from immediately opening and causing a sudden shift in camshaft 216 by providing a time delay. When pedal 252 is no longer depressed, such as when decelerating or when idling, spring 246 urges piston 244 and pedal 252 back in their original idling position.

Figure 10:
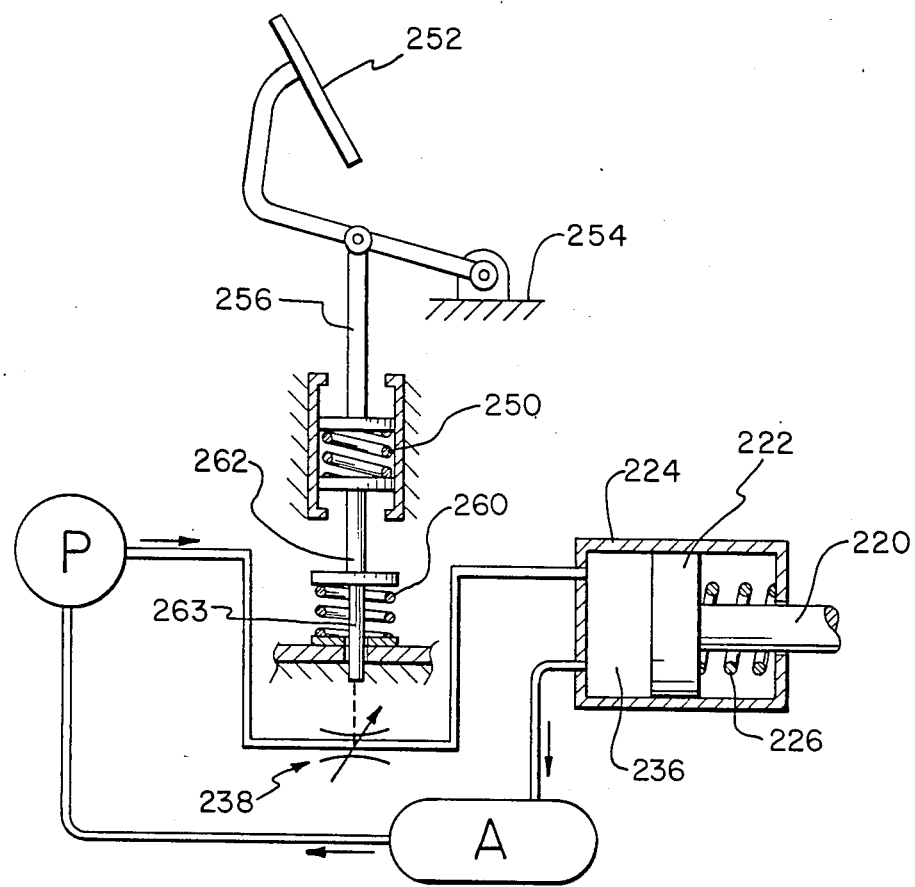
FIG. 10 is a second embodiment of the cam control mechanism which is part of the compression ratio control mechanism shown in FIG. 5.

In an alternative embodiment shown in FIG. 10, dashpot 240 is eliminated and only a return spring 260 is provided for urging pedal 252 back into a non-accelerating idle position. More specifically, spring 250 transmits the force provided by pedal 252 to spring 260 via member 262. When the force provided by spring 250 is greater than that of spring 260, member 262 and rod 263 connected to valve 238 move downwardly and valve 238 is opened. When pedal 252 is no longer depressed, spring 260 urges pedal 252 back into its original idling position. Rather than being connected to accelerator pedal 252, the control mechanism for cam 212 could be connected at any point in the throttle linkage for the engine, such as on the carburetor throttle rod (not shown).

A distributor advance mechanism 264 is also provided including a distributor 266 coupled to rod 220 by distributor advance member 266. In this fashion, distributor advance mechanism 264 provides for the advance or retard of the distributor timing without the need for a vacuum.

In operation, the compression ratio control mechanism controls the duration which the intake valve is open in response to the depression of pedal 252. When pedal 252 is not depressed and engine 10 is idling, cam 212 is axially in the position shown in FIG. 5 whereat the duration of which the intake valve is open is the longest. In this position, the intake valve remains open during most of the compression stroke thereby causing most of the air/fuel mixture which had previously entered the combustion chamber to exit the combustion chamber and reenter pressure chamber 86. Thus, the compression ratio remaining in the combustion chamber is relatively low e.g., 6:1, and engine 10 remains idling with relatively little power.

When pedal 252 is depressed, cam 212 is caused to axially move in the direction indicated by arrow X, thereby decreasing the duration of which the intake valve remains open during the compression stroke. Thus, when pedal 252 is depressed, less of the fuel and air mixture returns into pressure chamber 86 and, in fact, most of the fuel and air mixture remains in combustion chamber 16. The compression ratio at the end of the compression stroke becomes relatively high e.g., 12:1, thereby increasing the speed and power of engine 10.

It should be noted that the fuel and air mixture remains substantially constant whether a low or high compression ratio is being utilized, because check valve 94 allows fuel and air to enter pressure chamber 86 only when needed. Further, engine 10 operates more efficiently at all speeds and runs smoother when idling because carburetion choking is substantially eliminated.

While the invention has been described as having a specific embodiment, it will be understood that it is capable of further modification. This application is therefore intended to cover any variations, uses or adaptations of the invention following the general principles thereof and including such departures from the present disclosure as come within known or customary practice in the art to which this invention pertains and fall within the limits of the appended claims.

What is claimed is:

1. An internal combustion engine comprising:
   a combustion chamber, said chamber having a pair of pistons disposed therein;
   a presssure chamber;
   first valve means for providing selective communication between said pressure chamber and said combustion chamber;
   second valve means for providing selective communication between said pressure chamber and a fuel and air mixture supply; and
   compression ratio control means connected to said first valve means for opening said first valve means during the intake stroke of said piston and closing said first valve means at selected points during the compression stroke of said piston and retaining said first valve means closed until the subsequent intake stroke, whereby the compression ratio of said engine is variably controlled as a funciton of the point in the compression stroke at which the first valve means is closed.

2. The internal combustion engine of claim 1 wherein said second valve means comprises a check valve for causing said mixture to flow only into said pressure chamber.

3. The internal combustion engine of claim 1 wherein said compression ratio control means includes:
   an axially slidable camshaft mounted to said engine and adapted for rotational movement, said camshaft driven in timed relation by the engine;
   a cam connected to said camshaft rotating and axially sliding therewith, said cam having a lifting surface of greater duration axially at one end of said cam, said lifting surface starting at substantially the same point in time axially from one end of said cam to the other end of said cam as said cam rotates;
   a cam follower mechanism engaging said cam;
   said first valve means connected to said cam follower mechanism; and
   axial shifting means for selectively axially shifting said cam whereby said first valve means is caused to open by said lifting surface lifting said follower mechanism, said follower mechanism being lifted for different durations as said cam is shifted axially by said shifting means.

4. The internal combustion engine of claim 3 wherein said lifting surface duration increases substantially linearly axially from one end of said cam to the other.

5. The internal combustion engine of claim 3 wherein said cam follower mechanism includes a roller resting on said cam and a push rod adapted for axial motion substantially perpendicular to said cam and pivotally connected to said roller and a rocker arm connected to said first valve means.

6. An internal combustion engine comprising:
   a combustion chamber having a piston disposed therein;
   a pressure chamber;
   first valve means for providing selective communication between said pressure chamber and said combustion chamber;
   second valve means for providing selective communication between said pressure chamber and a fuel and air mixture supply; and
   compression ratio control means connected to said first valve means for opening said first valve means during the intake stroke of said piston and closing said first valve means at selected points during the compression stroke of said piston and retaining said first valve means closed until the subsequent intake stroke, whereby the compression ratio of said engine is variably controlled as a function of the point in the compression stroke at which the first valve means is closed;
   wherein said compression ratio control means includes:
   an axially slidable camshaft mounted to said engine and adapted for rotational movement, said camshaft driven in time relation by the engine;
   a cam connected to said camshaft rotating and axially sliding therewith, said cam having a lifting surface of greater duration axially at one end of said cam, said lifting surface starting at substantially the same point in time axially from one end of said cam to the other end of said cam as said cam rotates;
   a cam follower mechanism engaging said cam;
   said first valve means connected to said cam follower mechanism; and
   axial shifting means for selectively axially shifting said cam whereby said first valve means is caused to open by said lifting surface lifting said follower mechanism, said follower mechanism being lifted for different durations as said cam is shifted axially by said shifting means;
   wherein said axial shifting means includes:
   a hydraulic piston and cylinder assembly connected to said camshaft for causing axial motion of said camshaft, said hydraulic piston and cylinder assembly actuated by a hydraulic pressure supply; and
   hydraulic valve means connected between said hydraulic pressure supply and said hydraulic piston and cylinder assembly for controlling the hydraulic pressure in said hydraulic piston and cylinder assembly and controlling the axial position of said cam, said hydraulic valve means connected to and selectively controlled by a throttle linkage mechanism of said engine.

7. The internal combustion engine of claim 6 wherein said hydraulic valve means is a throttle valve.

8. The internal combustion engine of claim 6 wherein said hydraulic valve means is connected to and selectively controlled by an accelerator control pedal and wherein an accelerator spring is connected between said accelerator control pedal and said hydraulic valve means.

9. The internal combustion engine of claim 8 further comprising a dashpot connected between said accelerator spring and said hdyraulic valve means whereby a time delay is provided between the movement of said accelerator pedal and the opening of said hdyraulic valve means.

10. In a four cycle internal combustion engine having a combustion cylinder defining a combustion chamber with a piston disposed therein; a pressure chamber connected to said combustion chamber and to a fuel and air mixture intake passage, a check valve located between said pressure chamber and said intake passage for allowing said mixture to flow only towards said pressure chamber, an intake valve located between said pressure chamber and said combustion chamber, a compression ratio control mechanism comprising:
an axially slidable cam mounted to the engine and adapted for rotational movement, said cam driven in timed relation by the engine;
said cam having a lifting surface of increasing duration axially from one end of said cam to the other end of said cam, said lifting surface starting at substantially the same point in time axially from one end of said cam to the other end of said cam as said cam rotates;
a cam follower mechanism engaging said cam and coupled to said intake valve whereby said intake valve is opened by said lifting surface; and
axial shifting means for selectively axially shifting said cam, said intake valve being opened during the intake stroke of said piston and selectively closed at a point during the compression stroke of said piston depending on the axial position of said cam, said intake valve being retained closed until the subsequent intake stroke, whereby said pressure chamber is pressurized during the compression stroke after the bottom dead center piston position and before the closing of said intake valve, and said compression ratio in said combustion chamber is controlled by the point of closing said intake valve by axially shifting said cam;
wherein said axial shifting means includes:
a hydraulic piston and cylinder assembly connected to said camshaft for causing said axial motion of said camshaft, said hydraulic piston and cylinder assembly actuated by a hydraulic pressure supply;
spring means for causing axial motion of said camshaft in the opposite direction as that caused by said hydraulic piston and cylinder assembly;
hydraulic valve means connected between said hydraulic pressure supply and said hydraulic piston and cylinder assembly, said hydraulic valve means connected to and selectively controlled by an accelerator control pedal for controlling the hdyraulic pressure in said hydraulic piston and cylinder assembly and controlling the axial position of said cam.

11. The compression ratio control mechanism of claim 10 wherein said cam follower mechanism includes a roller engaging said cam and a push rod adapted for axial motion and pivotally connected to said roller at one end thereof and coupled to said intake valve at the other end thereof.

12. The compression ratio control mechanism of claim 10 wherein said axial shifting means includes:
a hydraulic piston and cylinder assembly connected to said camshaft for causing said axial motion of said camshaft, said hydraulic piston and cylinder assembly actuated by a hydraulic pressure supply;
spring means for causing axial motion of said camshaft in the opposite direction as that caused by said hydraulic piston and cylinder assembly;
hydraulic valve means connected between said hydraulic pressure supply and said hydraulic piston and cylinder assembly, said hydraulic valve means connected to and selectively controlled by an accelerator control pedal for controlling the hydraulic pressure in said hydraulic piston and cylinder assembly and controlling the axial position of said cam.

13. The compression ratio control mechanism of claim 12 wherein said hydraulic valve means is a variable resistance valve.

14. The compression ratio control mechanism of claim 12 wherein said connection between said hydraulic valve means and said accelerator control pedal includes an accelerator spring connected between said accelerator pedal and said hydraulic valve means.

15. The compression ratio control mechanism of claim 14 further comprising a dashpot connected between said accelerator spring and said hydraulic valve means whereby a time delay is provided between the movement of said accelerator pedal and the opening of said hyrdaulic valve means.

16. An internal combustion engine comprising:
a combustion chamber, said chamber having a pair of pistons disposed therein;
a pressure chamber;
first valve means for providing selective communication between said pressure chamber and said combustion chamber;
second valve means for providing selective communication between said pressure chamber and a fuel and air mixture supply;
engine throttle linkage; and
compression ratio control means connected to said first valve means for opening said valve means during the intake stroke of said piston and closing said first valve means at selected points during the compression stroke of said piston and retaining said first valve means closed until the subsequent intake stroke, said compression ratio control means being connected to and controlled by said throttle linkage, whereby the compression ratio of said engine is variably controlled as a function of the point of the compression stroke at which the throttle linkage closes said first valve means through the action of said compression ratio control means.

17. The engine of claim 16 wherein said throttle linkage includes an accelerator pedal mechanism, and said compression ratio control means is connected to said accelerator pedal mechanism.

18. An internal combustion engine comprising:
a combustion chamber having a piston disposed therein;
a pressure chamber;
first valve means for providing selective communication between said pressure chamber and said combustion chamber; second valve means for providing selective communication between said pressure chamber and a fuel and air mixture supply;

engine throttle linkage; and compression ratio control means connected to said first valve means for opening said valve means during the intake stroke of said piston and closing said first valve means at selected points during the compression stroke of said piston and retaining said first valve means closed until the subsequent intake stroke, said compression ratio control means being connected to and controlled by said throttle linkage, whereby the compression ratio of said engine is variably controlled as a function of the point of the compression stroke at which the throttle linkage closes said first valve means through the action of said compression ratio control means; wherein said throttle linkage includes an accelerator pedal mechanism, and said compression ratio control means is connected to said accelerator pedal mechanism, and including means connected between said pedal and said compression ratio control means to provide a time delay between the movement of the accelerator pedal and the activation of the compression ratio control means.

19. The engine of claim 1 wherein the pistons are in opposed relation to each other.

20. The engine of claim 10 wherein the pistons are in opposed relation to each other.

21. The engine of claim 16 wherein said pistons are in opposed relation to each other.

* * * * *

UNITED STATES PATENT AND TRADEMARK OFFICE
CERTIFICATE OF CORRECTION

PATENT NO.  : 4,753,198

DATED       : JUNE 28, 1988

INVENTOR(S) : KENNETH E. HEATH

It is certified that error appears in the above-identified patent and that said Letters Patent is hereby corrected as shown below:

```
Claim 1, line 48, change "funciton" to --function--.

Claim 9, line 11, change "hdyraulic" to --hydraulic--;
         line 13, change "hdyraulic" to --hydraulic--.
```

Signed and Sealed this

Twenty-second Day of November, 1988

Attest:

DONALD J. QUIGG

*Attesting Officer*                *Commissioner of Patents and Trademarks*